United States Patent [19]

Orlandi

[11] Patent Number: 5,040,566

[45] Date of Patent: Aug. 20, 1991

[54] BALL MIXING TAP FOR COLD AND HOT WATER

[75] Inventor: Alessio Orlandi, Castiglione D/Stiviere, Italy

[73] Assignee: Galatron S.r.l., Gastiglone D.S., Italy

[21] Appl. No.: 528,693

[22] Filed: May 24, 1990

[30] Foreign Application Priority Data

Jul. 11, 1989 [IT] Italy .................. 5188 A/89

[51] Int. Cl.$^5$ ........................... F16K 11/076
[52] U.S. Cl. .................. 137/625.41; 251/368; 251/315
[58] Field of Search ............ 251/368, 315; 137/625.4, 625.41

[56] References Cited

U.S. PATENT DOCUMENTS

| | | | |
|---|---|---|---|
| 3,823,742 | 7/1974 | Von Corpon | 137/625.41 X |
| 4,932,432 | 6/1990 | Berchem | 251/368 X |
| 4,936,546 | 6/1990 | Berchem | 251/368 X |

Primary Examiner—Arnold Rosenthal
Attorney, Agent, or Firm—McGlew & Tuttle, P.C.

[57] ABSTRACT

Mixing tap for hot and cold water fitted with a mixing ball with inlet holes matched with the separate hot and cold water feed pipes and outlet holes delivering the mixed water to a spout. At least the part of the ball with holes is made of a ceramic material and interacting with seals also made of ceramic material and coordinated to the hot and cold water feed pipes. Each ceramic seal is supported by an elastomer bellow type element acting both as a spring pushing the seal against the ball and as a radial packing around the seal itself.

4 Claims, 1 Drawing Sheet

BALL MIXING TAP FOR COLD AND HOT WATER

FIELD OF THE INVENTION

The present invention relates, in general, to the water tap sector and, more in particular, to hot and cold water mixing taps with a hollow mixing ball, at least oscillating and revolving inside a fixed body with inlet holes for the two types of water which are separately delivered by two ducts in said body and with outlet holes leading hot, cold and mixed water to a spout fitted to said body.

BACKGROUND OF THE INVENTION

Some mixing taps for hot and cold Water of the kind mentioned are already known, where the hollow mixing ball is made of metal, as for instance of steel, or of a synthetic resin, at least in its section with water inlet and outlet holes. To ensure the tightness at least of the water inlet holes, said ball interacts with gaskets which are coordinated to the feeding conducts of the two types of water. According to prior art said gaskets are made of rubber or a similar material and are usually pushed against the surface of the ball by individual springs.

This kind of sealing usually wears out as time goes by and requires a frequent maintenance to prevent dripping and loss of water. In fact, those gaskets are often subject to a quite heavy and rapid wear, especially owing to their contact with a metal ball where the rim of the water inlet holes, even if carefully finished, exert a rubbing and wearing action on the seals. Thus both seals and springs and furring as well require frequent replacements in order to prevent mixing taps from leaking.

SUMMARY AND OBJECTS OF THE INVENTION

It is instead an object of the invention to offer a remedy for the above mentioned defects and disadvantages, to grant a more efficient and long lasting seal on the mixing ball and thus reduce maintenance and water leakages. Another purpose of the invention is to solve the problems affecting the seals of the above mentioned mixing taps using simple means, i.e., by a contact between like materials and reducing wear to a reasonable minimum. Said means being apt to easily replace those usually mounted without changing the general structure of the mixing tap, with the obvious advantage of improving the tightness of already existing taps.

To this end, the object of the present invention is a spherical mixing tap for hot and cold water of the above specified type where the mixing ball or at least its portion comprising the necessary holes is of ceramic material and interacts with seals also made of ceramic material, at least as far as they are coordinated to hot and cold water inlet conducts, the front ends of said seals being concave and matching the surface of said hollow ball against which they are pressed.

To keep the seals pushed against the ball each of them is supported by a bellow-type element made of an elastomeric material acting both as a spring pushing the seal and as a radial tightening means around the seal and in its seat.

DESCRIPTION OF THE DRAWINGS

The herewith enclosed drawing shows an embodiment of the invention according to the following and more detailed description.

In said drawing.

DETAILED DESCRIPTION OF THE PREFERRED EMBODIMENT

Figure 1:
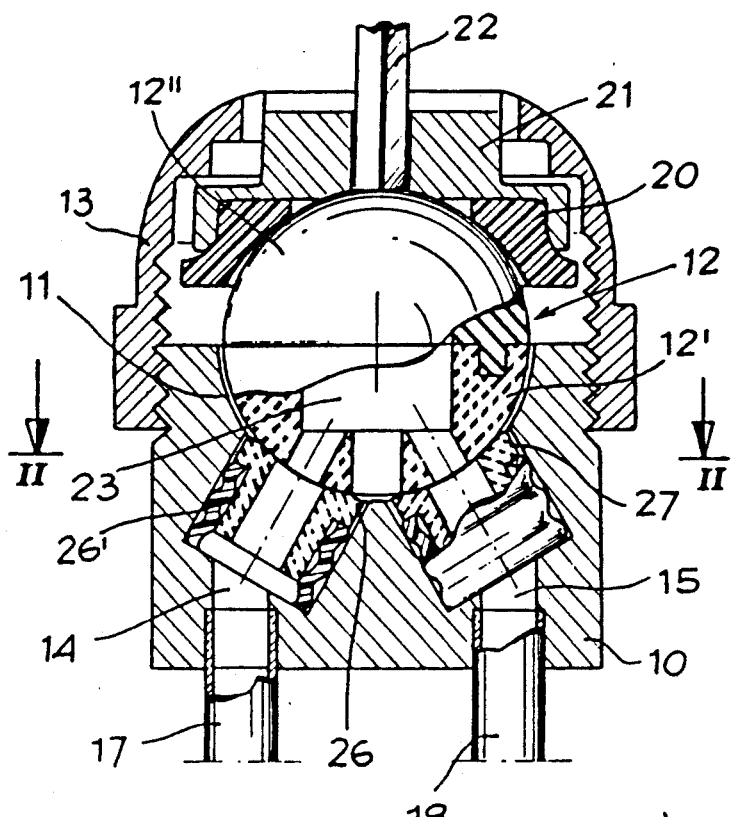
FIG. 1 shows a schematic section of the mixing tap.

The mixing tap here in question comprises as usual a body 10 with a spherical cavity 11 containing a hollow mixing ball 12 kept in place by a screw cap 13 covering body 10. To communicate with the spherical cavity 11 body 10 is fitted with a first inlet 14, a second inlet 15 and an outlet 16 connected, for instance, with a cold water feeding duct 17, with a hot water feeding duct 18 and with a spout 19 for the delivery of cold, hot or mixed water as requested for use.

Inside of cap 13 a gasket 20 is sealing the ball and fitted on a revolving disk 21 traversed by a pin 22 fixed on said ball.

The free end of pin 22 shall be coordinated and fixed to a control handle or lever—not represented —in such a way to cause the ball to oscillate or revolve according to a known technique to open and close the tap and to control the flow of mixed water.

From a mixing chamber 23, inside ball 12, some first holes 24 and some second holes 25 are radially extending and owing to the oscillatory and revolving motions of ball 12 said holes can be selectively aligned to the hot and cold water inlets 14, 15 and to the outlet 16 leading to spout 19.

Now, according to the present invention, said mixing ball 12 or at least its portion comprising inlet and outlet holes 24, 25 consists of a semispherical element 12' of ceramic material or of a compound material of ceramics and teflon and at any rate of a material selected among the so-called technical ceramics. Element 12' is fixed on a top semispherical body 12" made of another material, like a resin, and fitted with pin 22.

At least in each cold and hot water inlet 14, 15 a sealing 26, 27 respectively with a concave surface is fitted and designed to tightly abut on the surface of the semispherical element 12'. Also the seals 26, 27 are made of a ceramic or compound material like that of which element 12' of ball 12 is made of, so as to ensure a contact ball/seal between like materials with a low wearing coefficient and apt to grant perfect tightness.

Still according to the present invention, each seal 26, 27 is supported by a bellow-type element 28, 29 respectively, made of an elastomeric material, preferably of silicone, said sealing having a stem 26', 27' extending into the bellow-type element.

Each seal 26, 27 with its bellow-type supporting element 28, 29 is fitted with a certain preload into a cylindrical seat aligned with holes 14, 15. As a matter of fact, each bellow-type 28, 29 made of a substantially elastic material serves two different purposes, i.e.:

in the first instance they push the seal against the ball; and in the second instance they ensure a radial tightness around the relevant seal and on the seat in which it is fitted in.

In fact, the bellow-type elements 28, 29 can be selected with such a hardness and elasticity that when they have been fitted with the desired preload into their seats they constantly push, by reaction, seals 26, 27 against the relevant portion of ball 12' thus achieving a correct contact between ceramic and ceramic. On the other hand, the assemblage with a preload and the elasticity of the bellow-type elements 28, 29 allow their expansion and their tight contact with their rims to the stem of the seal on one side and to the inner surface of the relevant seat on the other side.

Figure 2:
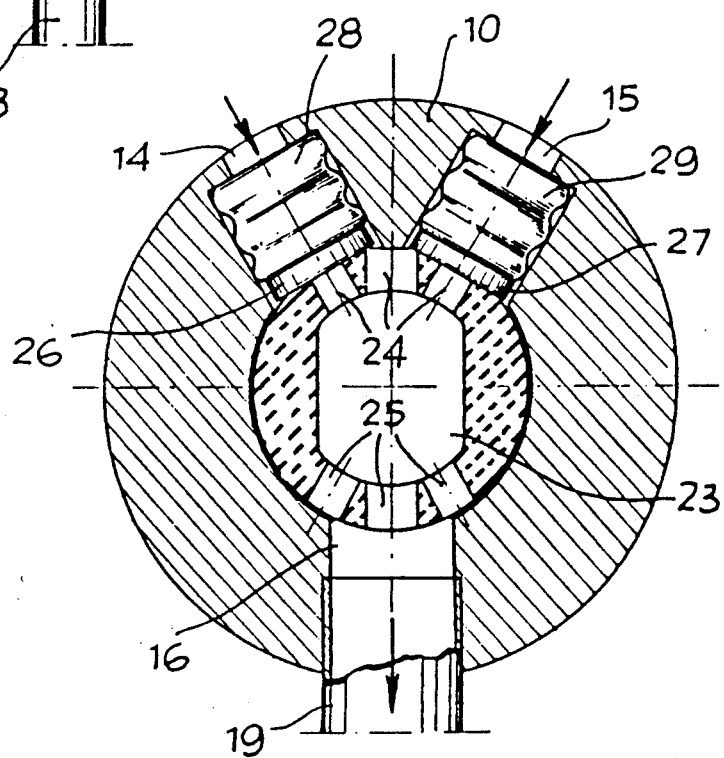
FIG. 2 shows a section through FIG. 1 corresponding to arrows II—II.
Figure 3:
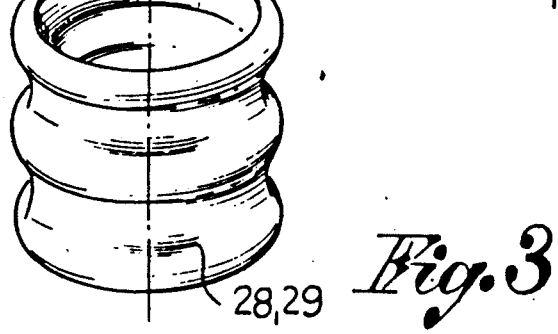
FIG. 3 shows a perspective view of a seal and its bellow-type element.

An embodiment of the seals made of a ceramic material and of their supporting elements is shown in FIG. 3 of the drawing, while FIGS. 1 and 2 show their position and the way said elements are acting in respect to the mixing ball.

The proposed solution thus achieves some remarkable purposes and advantages, as any expert can easily recognize and appreciate, as they actually improve the working life of the whole assembly in conditions of maximum efficiency regularity and uniformity of all movements of the mixing ball on and against its seals.

I claim:

1. Hot and cold water mixing tap comprising a hollow mixing ball which may at least oscillate and revolve inside a fixed body, including inlet holes for the two types of water separately delivered by two ducts in said fixed body, and outlet holes to take the hot, cold or mixed water to a spout connected to said fixed body, said first and second holes being aligned to said ducts owing to the oscillating and rotary motions of the ball, at least a portion of said hollow mixing ball including said inlet and outlet holes being formed of a ceramic material and interacting with seals formed of ceramic material and at least coordinated to the ducts delivering the two types of water to be mixed, the front end of said seals being spherically concave to match a portion of the hollow ball on which it is pressed each of said seals being supported by a bellow-type element made of an elastomeric material, said element being fitted with a given preload into a cylindrical seat which is concentric with one of said water delivery ducts and acting both as a spring pushing the seal towards said portion of the ball and as a tightening means around the seal and on the surface of said cylindrical seat.

2. Mixing tap according to claim 1, wherein the hollow mixing ball is composed of a semispherical portion of ceramic material featuring said first and second holes and of a second portion made of complementary material and supporting the first portion, said portion being fitted with control means for the oscillatory and rotary motions of the ball.

3. Mixing tap according to claim 1, wherein bellow-type elements are made of silicone or another similar material.

4. Mixing tap according to claim 1, wherein each seal is featuring a stem coaxially fitted into the bellow-type element and where the rims of the latter internally rest on said stem while they rest on the surface of the cylindrical seat with their outer border.

* * * * *